United States Patent
Ghule et al.

(10) Patent No.: US 10,819,617 B1
(45) Date of Patent: Oct. 27, 2020

(54) LOOP-BACK PACKET FOR DETERMINING OPERATIONAL CAPABILITIES OF BORDER RELAY DEVICE

(71) Applicant: Juniper Networks, Inc., Sunnyvale, CA (US)

(72) Inventors: Ashish Suresh Ghule, Bangalore (IN); Jagadish Narasimha Grandhi, Hyderabad (IN)

(73) Assignee: Juniper Networks, Inc., Sunnyvale, CA (US)

(*) Notice: Subject to any disclaimer, the term of this patent is extended or adjusted under 35 U.S.C. 154(b) by 7 days.

(21) Appl. No.: 16/393,076

(22) Filed: Apr. 24, 2019

(51) Int. Cl.
*H04L 12/715* (2013.01)
*H04L 12/26* (2006.01)
*H04L 12/733* (2013.01)

(52) U.S. Cl.
CPC .......... *H04L 43/50* (2013.01); *H04L 43/0805* (2013.01); *H04L 43/0864* (2013.01); *H04L 45/20* (2013.01)

(58) Field of Classification Search
CPC . H04L 43/50; H04L 43/0805; H04L 43/0864; H04L 45/20
See application file for complete search history.

(56) References Cited

U.S. PATENT DOCUMENTS

| | | | |
|---|---|---|---|
| 2019/0123999 A1* | 4/2019 | Chunduri | H04L 45/68 |
| 2019/0149449 A1* | 5/2019 | Morris | H04L 45/16 |
| | | | 709/238 |
| 2020/0127913 A1* | 4/2020 | Filsfils | H04L 45/50 |

OTHER PUBLICATIONS

Postel et al., "Internet Protocol," RFC 791, Internet Engineering Task Force, Sep. 1981, 49 pp.
Deering, S. et al. "Internet Protocol, Version 6 (IPv6) Specification", Network Working Group, RFC 2460, The Internet Society, Dec. 1998, 37 pp.
Townsley et al. "IPv6 Rapid Deployment on IPv4 Infrastructures (6rd)—Protocol Specification" RFC 5969, Internet Engineering Task Force, Aug. 2010, 18 pp.
Cui et al. "Lightweight 4over6: An Extension to the Dual-Stack Lite Architecture" RFC 7596, Internet Engineering Task Force, Jul. 2015, 22 pp.
Bush, R. ed. "The Address plus Port (A+P) Approach to the IPv4 Address Shortage" RFC 6346, Internet Engineering Task Force, Aug. 2011, 38 pp.
Troan et al., "Mapping of Address and Port with Encapsulation (MAP-E)," Internet Engineering Task Force (IETF), RFC 7597, Jul. 2015, 35pp.

* cited by examiner

*Primary Examiner* — Melvin C Marcelo
(74) *Attorney, Agent, or Firm* — Shumaker & Sieffert, P.A.

(57) ABSTRACT

This disclosure describes techniques to generate information of the operational characteristics of a border relay device. For example, a host device transmits a loop-back packet that travels through a forwarding path of the border relay device, rather than a control path, and back to the host device. Based on the host device receiving the loop-back packet, the host device may generate information indicative of operational characteristics of the border relay device.

20 Claims, 4 Drawing Sheets

US 10,819,617 B1

LOOP-BACK PACKET FOR DETERMINING OPERATIONAL CAPABILITIES OF BORDER RELAY DEVICE

TECHNICAL FIELD

This disclosure relates to computer networks, and more specifically, deploying network-layer protocols across computer networks.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it is necessary to transition from one communication protocol to another. This may occur, for example, when a provider network provides communication in accordance with an IPv6 protocol and subscriber devices and devices connected to a public network form packets in accordance with the IPv4 protocol. A host device encapsulates the IPv4 packets into IPv6 packets for downstream communication, and a border relay device decapsulates the IPv6 packets into IPv4 packets. In the upstream, the border relay device encapsulates IPv4 packets into IPv6 packets, and the host device decapsulates the IPv6 packets into IPv4 packets.

SUMMARY

In general, this disclosure is directed to techniques for determining operational capabilities (e.g., connectivity and functionality) of a border relay device that relies on utilizing a forwarding path through the border relay device with minimal to no utilization of a control path of the border relay device. The border relay device is configured to receive upstream packets, along a network, formed in accordance with IPv4 or IPv6 from a host device, and in examples where IPv6 data is received, convert the IPv6 packets into IPv4 packets for further upstream transmission. The border relay device is configured to receive downstream IPv4 packets, convert the IPv4 packets into IPv6 packets for further downstream transmission.

The forwarding path of the border relay device refers to a relatively fast communication path through fixed-function hardware circuitry of the border relay device that is configured to evaluate addresses of packets, perform encapsulation or decapsulation of the packets, and forward the packets in accordance with the addresses. The control path of the border relay device refers to a communication path through a central processing unit (CPU) of the border relay device. The CPU tends to require more clock cycles to process packets as compared to the clock cycles required by the fixed-function circuitry, and therefore, the latency through the control path tends to be greater than through the forwarding path. By utilizing the forwarding path to determine operational characteristics of the border relay device, the example techniques provide for practical applications for determining reachability and functionality of the border relay device in a relatively low latency manner with minimal overhead costs to the CPU.

In one or more examples, a host device generates an IPv4 loop-back packet that the host device encapsulates into an IPv6 packet that the host device transmits to the border relay device. A loop-back packet refers to a packet that the border relay device receives and sends back to the device that originated the packet. For example, the host device generates the loop-back packet such that the destination information of the loop-back packet is destination information of the host device. From the perspective of the border relay device, the border relay device forwards the loop-back packet back to the host device through normal operations of the forwarding path (e.g., decapsulates, forwards, encapsulates). The host device, based on reception of the loop-back packet, may generate information indicative of operational capabilities of the border relay device such as one or more of reachability, logical distance, maximum transmission unit (MTU) size, fragmentation and reassembly capabilities, and the like of the border relay device.

In one example, the disclosure describes a host device comprising a decapsulation unit configured to receive, from a border relay device through a provider network configured to carry packets according to a first protocol, a first packet generated according to the first protocol, wherein the first packet encapsulates a second packet generated according to a second protocol and decapsulate the first packet to extract the second packet. The host device also includes a processor configured to determine whether the second packet is a loop-back packet that the host device had previously transmitted to the border relay device, wherein the second packet is the loop-back packet when a source address, a source port, a destination address, and a destination port of the second packet belong to the host device and based on whether the second packet is the loop-back packet, generate information indicative of operational characteristics of the border relay device.

In one example, the disclosure describes a method comprising receiving, with a host device and from a border relay device through a provider network configured to carry packets according to a first protocol, a first packet generated according to the first protocol, wherein the first packet encapsulates a second packet generated according to a second protocol, decapsulating the first packet to extract the second packet, determining whether the second packet is a loop-back packet that the host device had previously transmitted to the border relay device, wherein the second packet is the loop-back packet when a source address, a source port, a destination address, and a destination port of the second packet belong to the host device, and based on whether the second packet is the loop-back packet, generating information indicative of operational characteristics of the border relay device.

In one example, the disclosure describes a system comprising a host device configured to transmit a first IPv6 packet that encapsulates a first IPv4 packet, wherein an IPv4 source address, an IPv4 source port, an IPv4 destination address, and an IPv4 destination port of the first IPv4 packet belong to the host device, and a border relay device configured to receive the first IPv6 packet and decapsulate the first IPv6 packet to extract the first IPv4 packet, based on the destination address of the first IPv4 packet, encapsulate the first IPv4 packet to generate a second IPv6 packet having an IPv6 destination address of the host device, and forward the second IPv6 packet to the host device. The host device is configured to decapsulate the second IPv6 packet to extract the first IPv4 packet, determine that the first IPv4 packet is a loop-back packet that the host device had previously transmitted to the border relay device, and based on the determination that the first IPv4 packet is the loop-back packet, generate information indicative of operational characteristics of the border relay device.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
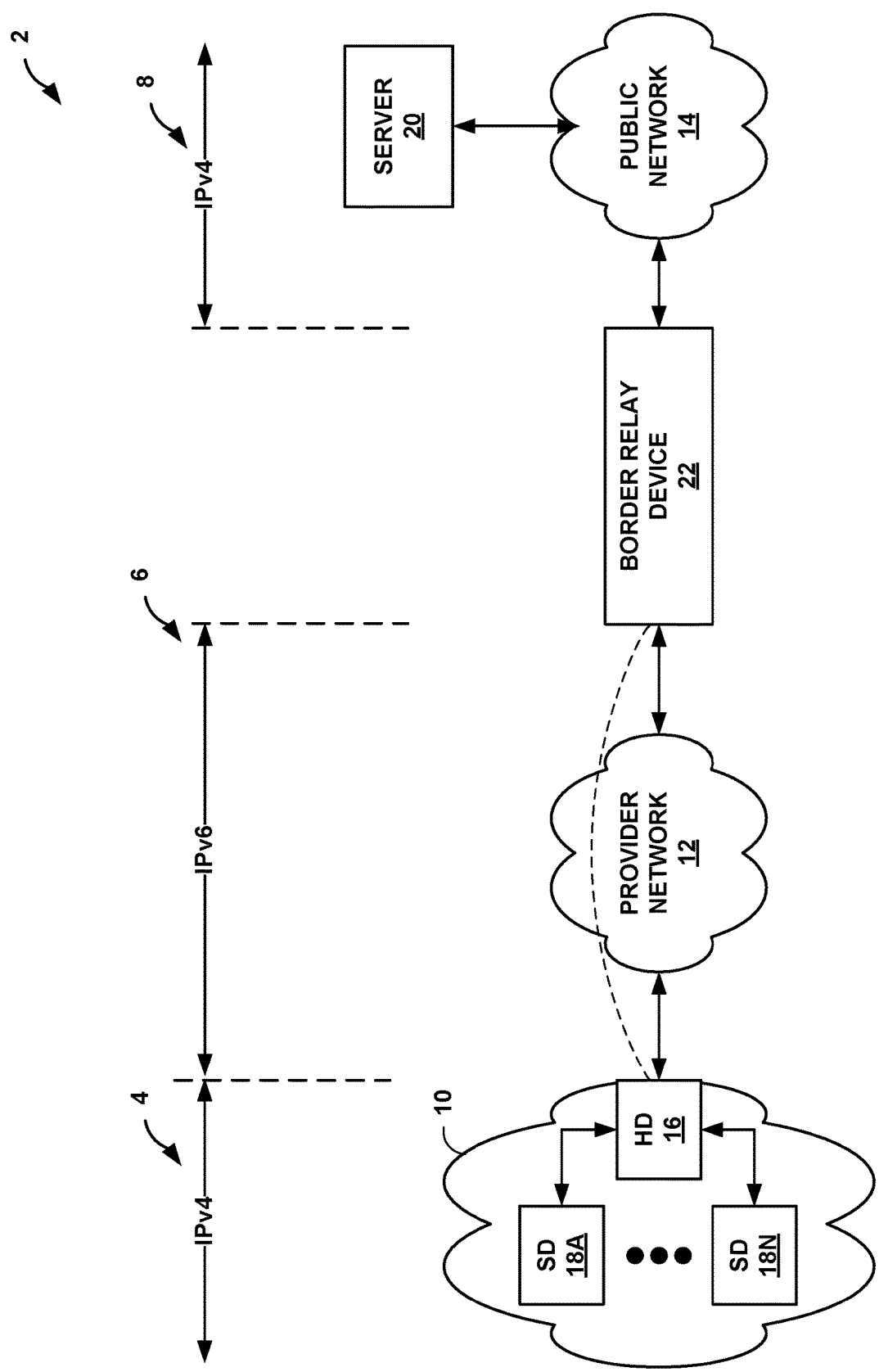
FIG. 1 is a block diagram illustrating an example network system that implements the techniques of this disclosure.

FIG. 1 is a block diagram illustrating an example network system 2 in which subscriber devices (SD) 18A-18N (collectively, "subscriber devices 18") and server 20 exchange data. As illustrated in FIG. 1, network system 2 includes subscriber network 10, provider network 12, and public network 14. Each network within network system 2 may operate in accordance with one or more network-layer protocol (i.e., layer three of the OSI model). As illustrated in FIG. 1, different segments of network system 2 operate in accordance with different network-layer protocols. For example, network segments 4 and 8 operate in accordance with Internet Protocol version 4 (IPv4) as described in RFC 791, entitled "Internet Protocol" to Jon Postel et al., September 1981, the entire content of which is incorporated herein by reference. As another example, network segment 6 operates in accordance with Internet Protocol version 6 (IPv6) as described in request for comments (RFC) 2460, entitled "Internet Protocol, Version 6 (IPv6) Specification" to S. Deering et al., December 1998, the entire content of which is incorporated herein by reference.

The example techniques are described with respect to IPv6 and may be applicable to various types of IPv6 mechanisms. For instance, the example techniques may be applicable to IPv6 Rapid Deployment (6rd) in RFC 5969, IPv6 dual-stack lite (DS-lite) in RFC 7596, IPv6 4rd in RFC 6346, as a few examples.

As illustrated in FIG. 1, subscriber network 10 and public network 14 send and receive network messages in accordance with IPv4. Provider network 12 sends and receives network messages in accordance with IPv6. While described as implementing IPv6, provider network 12 may also implement IPv4 or a combination of IPv4 and IPv6. Similarly, although described as implementing IPv4, subscriber network 10 and public network 14 may also implement IPv6 or a combination of IPv4 and IPv6.

Subscriber network 10 includes host device (HD) 16 and subscriber devices 18. Host device 16 providers a gateway by which the subscriber devices 18 connect to provider network 12 and thereby access public network 14. Host device 16 typically comprises a wireless router or other home networking device, such as a hub, a switch, a router, a cable modem, a digital subscriber line (DSL) modem or any other device that provides access or otherwise connects subscriber devices 18 to public network 14 or other wide area network (WAN). Typically, subscriber devices 18 are connected to host device 16 via wired or wireless network protocols, such as Ethernet or 802.11g. Examples of subscriber devices 18 include personal computers, laptop computers, workstations, tablet computers, personal digital assistants (PDAs), wireless device, network-ready appliances, and the like.

Provider network 12 may represent a public network that is owned and operated by an Internet service provider (ISP) to provide network access to one or more subscriber devices 18. As a result, provider network 12 may be referred to herein as a service provider (SP) network. Provider network 12 may connect to one or more customer networks (e.g., subscriber network 10). While the example network system 2 illustrated in FIG. 1 includes one provider network 12, other examples may include multiple provider networks 12.

Public network 14 may comprise any set of one or more interconnected public networks, such as the Internet. Public network 14 may include other conventional network devices, such as routers, media gateways, switches, hubs, and network accelerators, to communicate data between subscriber devices 18 and server 20. Server 20 represents any device that provides one or more network resources accessible to subscriber devices 18. For example, server 20 may include email servers, domain controllers, web servers, print servers, printers, network copiers, gateways, intelligent switches, hubs, routers or other network access points or devices.

Border relay device 22 may comprise a layer two (L2) switch, a layer three (L3) router or another type of network device that facilitates the transfer of data within network system 2. In some examples, border relay device 22 may also perform bridging functions, firewall functions, intrusion detection functions, security functions, or other network functions. Further, although shown and described as providing L3 services, border relay device 22 may be any network element that provides services for other layers of the network stack. As one example, border relay device 22 may be a network router that integrates L2 and L3 services so as to provide L2 forwarding services as well as L3 routing functions. As shown in the example of FIG. 1, border relay device 22 is connected to provider network 12 and public network 14 and exchanges data between provider network 12 and public network 14. In other examples, border relay device 22 may be connected to subscriber network 10 and provider network 12. Generally, border relay device 22 may be placed at the edge of any access network, service provider network, or public network.

Border relay device 22 is configured to provide an ingress and egress for packets tunneled from host device 16 through provider network 12 to border relay device 22. Upon receiving a packet, border relay device 22 determines whether the packet requires one or more services to be applied to the packet based on header information included within the packet. For example, border relay device 22 may be configured to encapsulate a packet formed in accordance with IPv4 into an IPv6 packet and vice-versa in accordance with mapping of address and port with encapsulation (MAP-E) techniques described in RFC 7597.

HD 16 and border relay device 22 are both assigned IPv6 and IPv4 source and destination addresses. As an example, in the upstream, for HD 16 to transmit a packet to server 20, HD 16 generates an IPv4 packet. The IPv4 packet includes the IPv4 source address and source port of HD 16 and the IPv4 destination address and destination port of server 20. HD 16 encapsulates the IPv4 packet into an IPv6 packet. The IPv6 packet includes the IPv6 source address of HD 16 and the IPv6 destination address of border relay device 22.

Border relay device 22 receives the IPv6 packet and decapsulates the IPv6 packet to extract the IPv4 packet. Border relay device 22, based on the IPv4 destination address of server 20, forwards the IPv4 packet to server 20 through public network 14.

In the downstream, for border relay device 22 to transmit a packet to SDs 18, border relay device 22 generates an IPv4 packet. The IPv4 packet includes the IPv4 source address and source port of border relay device 22 and the IPv4 destination address and destination port of HD 16. Border relay device 22 encapsulates the IPv4 packet into an IPv6 packet. The IPv6 packet includes the IPv6 source address of border relay device 22 and the IPv6 destination address of HD 16.

HD 16 receives the IPv6 packet and decapsulates the IPv6 packet to extract the IPv4 packet. HD 16, based on the IPv4 destination address of one or more of SDs 18, forwards the IPv4 packet to one or more of SDs 18.

In accordance with one or more example techniques described in this disclosure, HD 16 may output a loop-back packet, also called "hair pinned packet." In the loop-back packet, the IPv4 destination address and port of the packet is the same as an IPv4 destination address and port of HD 16. In this example, border relay device 22 receives a packet (e.g., IPv6) packet from HD 16, performs decapsulation to determine that the packet is to be sent back to HD 16, performs encapsulation back to an IPv6 packet, and sends the packet back to HD 16.

HD 16 may be configured to determine operational characteristics of border relay device 22 based on the received loop-back packet. For example, after HD 16 receives the loop-back packet, HD 16 generates information indicative of the operational characteristics of border relay device 22. Provider network 12 may access the information indicative of the operational characteristics of border relay device 22 and determine whether any adjustments to border relay device 22 or provider network 12 are needed. As one example, provider network 12 accessing information may refer to a server device of provider network 12 periodically polling information from HD 16. As another example, provider network 12 accessing information may refer to an administrator of provider network 12 requesting the information. As another example, HD 16 may be configured to periodically output information indicative of the operational characteristics of border relay device 22 to a server of provider network 12.

In accordance with one or more example techniques described in this disclosure, HD 16 generates a packet in accordance with IPv4 and assigns an IPv4 destination address and a destination port for where the IPv4 packet to be transmitted as a destination address and a destination port that belongs to HD 16, and thus identify HD 16 as the destination for the IPv4 packet. The IPv4 packet also includes an IPv4 source address and a source port which belong to HD 16, and thus identify HD 16 as the source of the IPv4 packet. It may be possible for the source address and the destination address to be the same and for the source port and destination port to be the same, but the techniques are not so limited. Because the source address and port and destination address and port for the IPv4 packet belong to HD 16, the IPv4 packet is considered to be a loop-back packet (e.g., a packet that is to loop-back from the device that originated the packet).

HD 16 encapsulates the IPv4 loop-back packet into an IPv6 packet and forwards the IPv6 packet to border relay device 22 via provider network 12. For example, the IPv6 packet includes an IPv6 destination address of border relay device 22. Border relay device 22 decapsulates the IPv6 packet into the IPv4 packet. Based on the destination address and port of the IPv4 packet, border relay device 22 determines that the IPv4 packet is to be transmitted to HD 16. Border relay device 22 encapsulates the IPv4 packet into an IPv6 packet and forwards the IPv6 packet to HD 16. For example, border relay device 22 assigns the IPv6 destination address of the IPv6 packet as the IPv6 destination address of HD 16.

After HD 16 receives the IPv6 packet, HD 16 decapsulates the packet into an IPv4 packet. HD 16 may determine whether the IPv4 packet is a loop-back packet (e.g., based on the source address and port and destination address and port all being the same, or based on a unique payload HD 16 may have embedded in the IPv4 packet). Based on the IPv4 packet being a loop-back packet, HD 16 may generate information indicative of operational characteristics of border relay device 22.

From the perspective of border relay device 22, border relay device 22 performed normal forwarding operations. For instance, border relay device 22 is unaware that the IPv4 packet is a loop-back packet. Border relay device 22 decapsulates the IPv6 packet and encapsulates the IPv4 packet the same as border relay device 22 would for non-loop-back packets. Therefore, border relay device 22 may not need to perform any additional operations then the normal forwarding operations that border relay device 22 is configured to perform. Generally, the forwarding operations of border relay device 22 occur with little delay. Accordingly, HD 16 may receive the loop-back packet relatively quickly for generating information indicative of the operational characteristics of border relay device 22.

In this disclosure, HD 16 generating information indicative of the operational characteristics of border relay device 22 includes examples where HD 16 gathers information that is used to determine operational characteristics of border relay device 22. For instance, HD 16 need not necessarily be the device that determines the operational characteristics of border relay device 22. Rather, HD 16 may output information that HD 16 gathered based on the IPv4 packet being a loop-back packet to provider network 12, and provider network 12 may determine the operational characteristics. However, in some examples, HD 16 may be configured to determine the operational characteristics. In such example, generating information indicative of the operational characteristics includes HD 16 determining the operational characteristics and generating information of the determined operational characteristics.

As one example, if HD 16 receives an IPv6 packet, decapsulates the IPv6 packet and determines that the IPv4 packet that the IPv6 packet encapsulated is a loop-back packet, then HD 16 may generate information indicating that border relay device 22 is reachable. For example, HD 16 may output to provider network 12 that HD 16 received the loop-back packet, and provider network 12 may utilize this information to determine that border relay device 22 is reachable. As another example, HD 16 may output information to provider network 12 indicating that border relay device 22 is reachable. Also, if HD 16 receives a properly formed IPv6 packet that encapsulated an IPv4 loop-back packet, then HD 16 may generate information indicating that the decapsulation-encapsulation process of border relay device 22 is operating correctly.

As another example, HD 16 includes a time-to-live (TTL) value in the IPv4 loop-back packet that indicates a number of hops that the IPv4 loop-back packet is permitted to travel before being discarded. A hop, in this context, may be a logical hop. For example, after HD 16 encapsulates the IPv4 loop-back packet into an IPv6 packet, the IPv6 packet may be processed by multiple intermediate routers between HD 16 and border relay device 22. However, none of these intermediate routers may process the encapsulated IPv4 loop-back packet, but merely forward the IPv6 packet.

After border relay device 22 decapsulates the IPv6 packet and extract the IPv4 packet, border relay device 22 determines the TTL value in the IPv4 packet. If the TTL value is decremented only by one (e.g., one less than the TTL value that HD 16 assigned in the IPv4 loop-back packet), then HD 16 may generate information indicating that border relay device 22 is logically one hop away from HD 16 (e.g., only one border relay device 22 decapsulated the IPv6 packet). If the TTL value is reduced by more than one, then HD 16 may generate information indicating that border relay device 22 is more than one logical hop away.

In some examples, border relay device 22 may be configured with a maximum transmission unit (MTU) that defines the maximum size of a packet that border relay device 22 outputs. In some examples, HD 16 may be configured to transmit successive loop-back packets having different packet sizes. For example, HD 16 transmits a loop-back packet that is 1000 bytes, followed by a loop-back packet that is 1500 bytes, followed by a loop-back packet that is 2000 bytes, and so forth. In each case, the encapsulation to generate the IPv6 packets adds on approximately 40 bytes.

As long as the size of the loop-back packet is less than the MTU size, border relay device 22 should transmit back the loop-back packet (e.g., IPv4 packet encapsulated in IPv6 packet, where the IPv4 packet has source address, source port, destination address, and destination port that belong to HD 16) with the same size. However, when the loop-back packet size becomes too large (e.g., so that the total IPv6 is greater than MTU size), border relay device 22 may not transmit back the loop-back packet or may fragment the loop-back packet. HD 16 may determine for which loop-back packet of the successive loop-back packets border relay device 22 did not transmit back the loop-back packet of the successive loop-back packets or border relay device 22 fragmented the loop-back packet of the successive loop-back packets. HD 16 may generate information indicative of at least one of the MTU or fragmentation and/or reassembly capabilities of border relay device 22.

For example, if the loop-back packet of 2500 bytes was not received back or was fragmented, then HD 16 may generate information indicating that the MTU size for border relay device 22 is between 2000 bytes and 2500 bytes. As an example of information that HD 16 may generate indicative of the MTU size, HD 16 may output to provider network 12 information that a loop-back packet of 2000 bytes was received but a loop-back packet of 2500 bytes was not received. Provider network 12 may then determine that the MTU size is between 2000 and 2500 bytes based on the received information. In some examples, HD 16 may determine that the MTU size is between 2000 and 2500 bytes and output information indicative of the MTU size to provider network 12. Both cases are examples of HD 16 generating information indicating that the MTU size for border relay device 22.

As described above, border relay device 22 may be configured to fragment a packet such as where the packet is greater than the MTU size. There may be at least two different ways in which to fragment a packet. In a first example, border relay device 22 fragments the IPv4 inner packet into two IPv4 packets and separately encapsulates each of the two IPv4 packets. In a second example, border relay device 22 fragments the IPv6 header portion. In one or more examples, HD 16 generates information indicative of a manner in which border relay device 22 fragments packets based on the reception of the loop-back packet.

As an example, if the IPv4 packet plus the IPv6 header size is greater than MTU size, then the IPv6 fragmentation may happen as follows. Border relay device 22 inserts IPv4 packet into IPv6, such that the entire packet is like just another IPv6 packet. Based on MTU, border relay device 22 fragments IPv6 packet using IPv6 Fragment Header. The result may be two IPv6 packets as follows. The first IPv6 packet may be IPv6 header plus IPv6 fragment header (frag-offset+MF=1)+IPv4_packet_portion1. The second IPv6 packet may be IPv6 packet 2 plus IPv6 header+IPv6 fragment header(frag-offset+MF=0)+IPv4_packet_portion2.

In some examples, HD 16 determines a time when HD 16 transmitted the loop-back packet. HD 16 then determines a time when HD 16 received the loop-back packet. As described above, the loop-back packet travels through the forwarding path of border relay device 22, which is a relatively fast path. Therefore, by determining a difference in the time when HD 16 transmitted the loop-back packet and when HD 16 received the loop-back packet, HD 16 may generate information indicative of a latency (including loss and delay measurements) through provider network 12.

The above are a few examples of information that HD 16 may gather for determining operational capabilities of border relay device 22. The above examples are non-limiting, and HD 16 may utilize the loop-back packet to determine additional operational capabilities of border relay device 22. For example, HD 16 transmits an IPv4 loop-back packet or an IPv6 packet that includes the IPv4 loop-back packet that is malformed in such a way that HD 16 should not receive the loop-back packet. However, if HD 16 receives the loop-back packet, HD 16 may generate information indicative of border relay device 22 not properly discarding malformed packets.

In this manner, the techniques described in this disclosure generate information that is used to determine operational characteristics of border relay device 22 in a way that leverage the forwarding path operations of border relay device 22, which are specifically configured to have low latency. For instance, other techniques for determining reachability of border relay device 22 rely on Internet Control Message Protocol (ICMP) messages such as ping-messages. These ICMP messages are processed through a control path through a central processing unit (CPU) of border relay device 22, and the latency through the control path is greater than through the forwarding path. This latency may be problematic because if many devices like HD 16 send ICMP messages at a similar time, the CPU of border relay device 22 may become bogged down and border relay device 22 may malfunction. In some cases, even if border relay device 22 does not completely malfunction, border relay device 22 may drop sending back ICMP messages.

Figure 2:
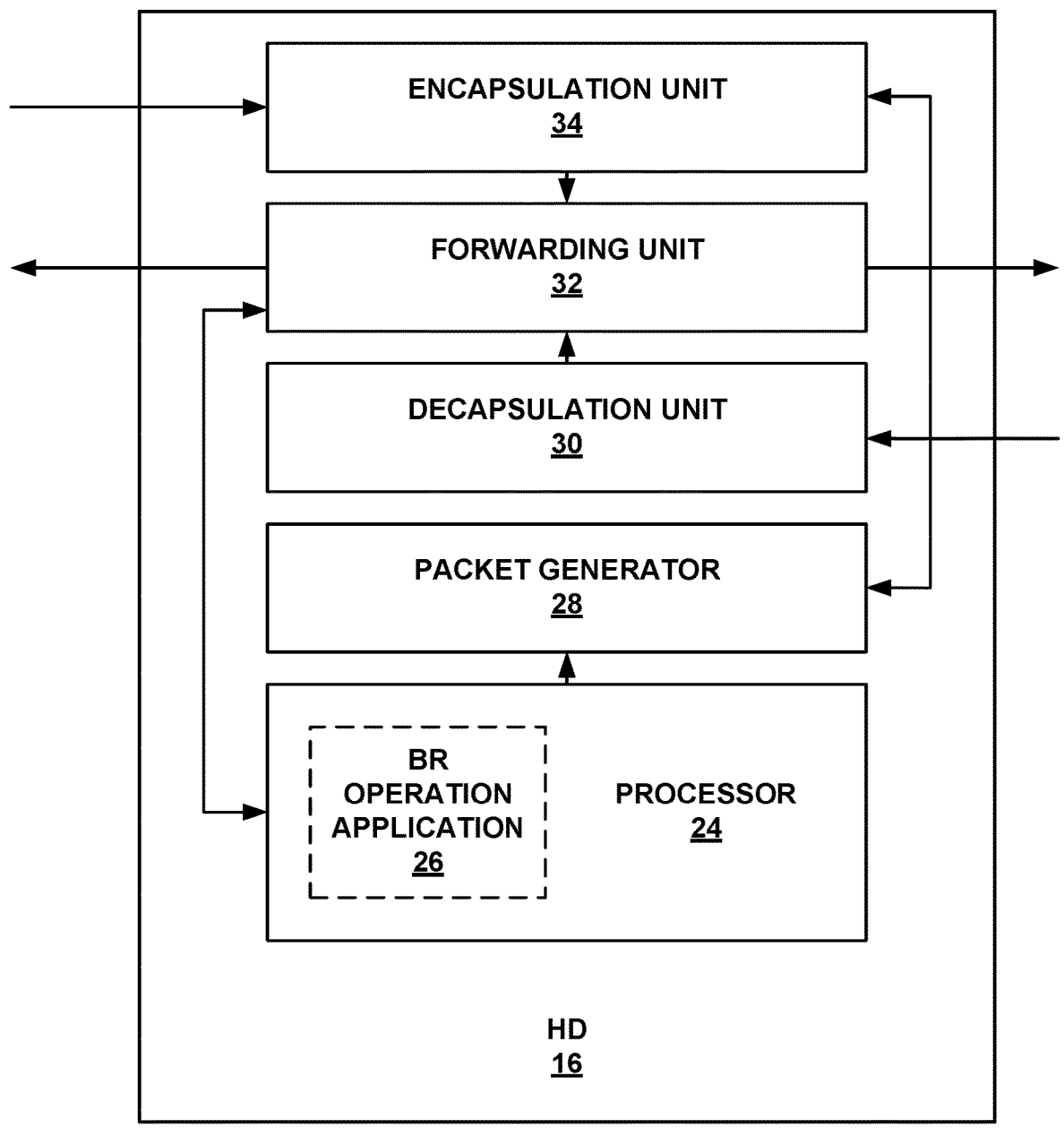
FIG. 2 is a block diagram illustrating an example host device that implements the techniques of this disclosure.

FIG. 2 is a block diagram illustrating an example host device that implements the techniques of this disclosure. As illustrated, HD 16 includes processor 24, packet generator 28, decapsulation unit 30, forwarding unit 32, and encapsulation unit 34. In some examples, packet generator 28 may be part of processor 24 and may be configured to generate loop-back packets in accordance with the techniques described in this disclosure.

Examples of processor 24 include a general purpose processor, a digital signal processor (DSP), an application specific integrated circuit (ASIC), a field programmable logic array (FPGA), or other equivalent integrated or discrete logic circuitry. As one example, processor 24 is configured to execute border relay (BR) operation application 26. Processor 24 may be configured to perform the example techniques described in this disclosure in response to execution of BR operation application 26. As one example, a computer-readable storage medium (not shown in FIG. 2) stores instructions thereon (e.g., instructions of BR operation application 26) that when executed cause one or more processors (e.g., processor 24) to perform the example techniques described in this disclosure. For example, processor 24 may include arithmetic logic units (ALUs), elementary function units (EFUs), digital circuits, analog circuits, and/or programmable cores, formed from programmable circuits. In examples where the operations are performed using software executed by the programmable circuits, a computer-readable storage device may store the object code of the software (e.g., BR operation application 26) that processor 24 receives and executes.

Decapsulation unit 30, forwarding unit 32, and encapsulation unit 34 may be formed in processing circuitry separate from processor 24; although it is possible for processor 24, decapsulation unit 30, forwarding unit 32, and encapsulation unit 34 to be formed in the same circuitry. As one example, decapsulation unit 30, forwarding unit 32, and encapsulation unit 34 may be formed in one or more ASICs or FPGAs. In some examples, decapsulation unit 30, forwarding unit 32, and encapsulation unit 34 are dedicated hardware circuit blocks that are configured to perform forwarding operations of forwarding packets from source to destination.

Processor 24 forms a so-called control path and decapsulation unit 30, forwarding unit 32, and encapsulation unit 34 form a forwarding path of HD 16. Processor 24 determines the information that forwarding unit 32 uses to forward packets. For example, processor 24 may be configured to perform operations such as allocate resources, determining routing state, address resolution protocol (ARP) handling, security functions, establishing and maintaining management sessions, and the like. The forwarding path that includes decapsulation unit 30, forwarding unit 32, and encapsulation unit 34 is a fast path because packets are continuously being received or transmitted by HD 16 and therefore the decapsulation, forwarding, and encapsulation operations need to occur relatively fast. In this way, the operations of processor 24 and decapsulation unit 30, forwarding unit 32, and encapsulation unit 34 may be separated out from one another.

In accordance with one or more example techniques described in this disclosure, decapsulation unit 30 receives, from border relay device 22 through provider network 12 configured to carry packets according to a first protocol (e.g., IPv6), a first packet generated according to the first protocol (e.g., an IPv6 packet). The first packet encapsulates a second packet generated according to a second protocol (e.g., an IPv4 packet). Decapsulation unit 30 decapsulates the first packet to extract the second packet (e.g., using MAP-E techniques).

Forwarding unit 32 receives the second packet and determines where the second packet is to be forwarded. For example, as described above, the second packet includes an IPv4 destination address and port. Based on the IPv4 destination address and port, forwarding unit 32 may determine where to forward the second packet. In some examples where the destination address and port are those of HD 16, forwarding unit 32 forwards the packet to processor 24.

Processor 24 (e.g., via execution of BR operation application 26) determines whether the second packet is a loop-back packet that HD 16 had previously transmitted to border relay device 22. As one example, the second packet is a loop-back packet when a source address, a source port, a destination address, and a destination port of the second packet belong to HD 16. That is, the IPv4 source address and port and the IPv4 destination address and port for the loop-back packet all belong to HD 16. Processor 24 may determine that the second packet is a loop-back packet based on the addresses and ports or may determine that the second packet is a loop-back packet based on information that processor 24 included in the second packet at the time of transmission.

If the second packet is not a loop-back packet, processor 24 may be configured to perform operations based on the payload of the packet (e.g., generate error message, update routing information, reconfigure security, etc.). If the second packet is a loop-back packet, processor 24 may generate information indicative of operation characteristics of border relay device 22.

There may be various ways in which HD 16 may generate a loop-back packet. For example, BR operation application 26 may cause processor 24 to configure packet generator 28 to generate the second packet according to the second protocol and assign the source address, the source port, the destination address, and the destination port from source addresses, source ports, destination addresses, and destination ports belonging to the host device. Encapsulation unit 34 encapsulates (e.g., using MAP-E techniques) the second packet into the first packet according to the first protocol. For example, encapsulation unit 34 encapsulates the IPv4 loop-back packet (e.g., second packet) into an IPv6 packet according to the IPv6 protocol. Forwarding unit 32 outputs the first packet according to the first protocol to border relay device 22.

The following is a list of examples of information that processor 24 (e.g., via execution of BR operation application 26) may generate that is indicative of the operational capabilities of border relay device 22. Processor 24 may be configured to generate one or more of the following example types of information indicative of the operational capabilities of border relay device 22. As described above, processor 24 generating information indicative of operational characteristics of border relay device 22 includes examples where processor 24 gathers information that is used to determine operational characteristics of border relay device 22 and examples where processor 24 determines the operational characteristics of border relay device 22.

Non-limiting examples of the operational characteristics of border relay device 22 include whether border relay device 22 is reachable, whether decapsulation-encapsulation of border relay device 22 is operating correctly, whether border relay device 22 is one logical hop away, what the MTU size and fragmentation and/or reassembly capabilities of border relay device 22 are, and the like. Also, in some examples, processor 24 may generate information indicative of the latency (including loss and delay measurements) through provider network 12.

As described above, processor 24 may determine whether the second packet is a loop-back packet and based on the second packet being a loop-back packet, processor 24 may generate information indicative of the operational capabilities of border relay device 22. For example, processor 24 generates information indicative of border relay device 22 being reachable based on the second packet being the loop-back packet. Processor 24 generates information indicative of decapsulation and encapsulation operation at border relay device 22 being performed correctly based on the second packet being the loop-back packet. For instance, because HD 16 received the loop-back packet, that means that border relay device 22 properly decapsulated the IPv6 packet to extract the IPv4 packet and then encapsulated the IPv4 packet into an IPv6 packet for transmission back to HD 16.

In some examples, processor 24 includes a TTL value in the second packet (e.g., IPv4 loop-back packet) that packet generator 28 generates. Processor 24 may be configured to generate information indicative of whether border relay device 22 is logically one hop from HD 16 based on the TTL value in the second packet. For example, processor 24 reads the TTL value from the second packet and determines by how much the TTL value decremented. If the TTL value decremented by one, then processor 24 may generate information indicative that border relay device 22 is one hop away (e.g., no other intermediate device processed the IPv4 packet). If the TTL value decremented by more than one, then processor 24 may generate information indicative that border relay device 22 is more than one hop away. If the TTL value did not decrement, then processor 24 may generate information indicative of the TTL processing functionality of border relay device 22 malfunctioning.

As another example, processor 24 may generate information indicative of an MTU size, fragmentation capabilities, or reassembly capabilities of border relay device 22. For example, processor 24 causes packet generator 28 to generate successive loop-back packets having different packet sizes. Encapsulation unit 34 encapsulates each of the successive loop-back packets and forwarding unit 32 outputs each of the successive loop-back packets to border relay device 22. Processor 24 may determine for which loop-back packet of the successive loop-back packets border relay device 22 did not transmit back the loop-back packet of the successive loop-back packets or border relay device 22 fragmented the loop-back packet of the successive loop-back packets. Processor 24 may generate information indicative of at least one of an MTU or fragmentation and/or reassembly capabilities of border relay device 22 based on the determination of the loop-back packet of the successive loop-back packets that border relay device 22 did not transmit back or that border relay device 22 fragmented.

In some examples, in the reverse, processor 24 causes packet generator 28 to generate fragmented packets that encapsulation unit 34 encapsulates and forwarding unit 32 outputs to border relay device 22. Border relay device 22 may combine the fragmented packets back and transmit a complete packet as the loop-back packet to HD 16. Processor 24 may generate information indicative of the reassembly capabilities of border relay device 22 based on the received loop-back packet when HD 16 transmitted fragmented packets.

For example, HD 16 sends loopback packets such that fragmented IPv4 are inserted in IPv6 packet. If HD 16 receives reassembled IPv4 packets, then HD 16 can determine that border relay device 22 supports IPv4 reassembly. As another example, HD 16 sends loopback packets such that IPv6 packet is fragmented. If HD 16 receives the entire IPv6 packet reassembled along with correct inner IPv4 packets, then HD 16 can determine border relay device 22 supports IPv6 reassembly. In this manner, HD 16 may determine if border relay device 22 supports one or both of IPv4/IPv6 reassembly.

As described above, because the example techniques leverage the forwarding path (e.g., fast path) of border relay device 22, the time difference when HD 16 device transmitted a loop-back packet and the time when HD 16 receives the loop-back packet may be indicative of the latency (including loss and delay measurements) through provider network 12. For example, processor 24 determines a time at which the second packet (e.g., IPv4 loop-back packet) is received and a time at which HD 16 had previously transmitted the second packet to the border relay device and generates information indicative of a latency (including loss and delay measurements) through the service provider network based on the time at which the second packet is received and the time at which HD 16 had previously transmitted the second packet to border relay device 22.

Figure 3:
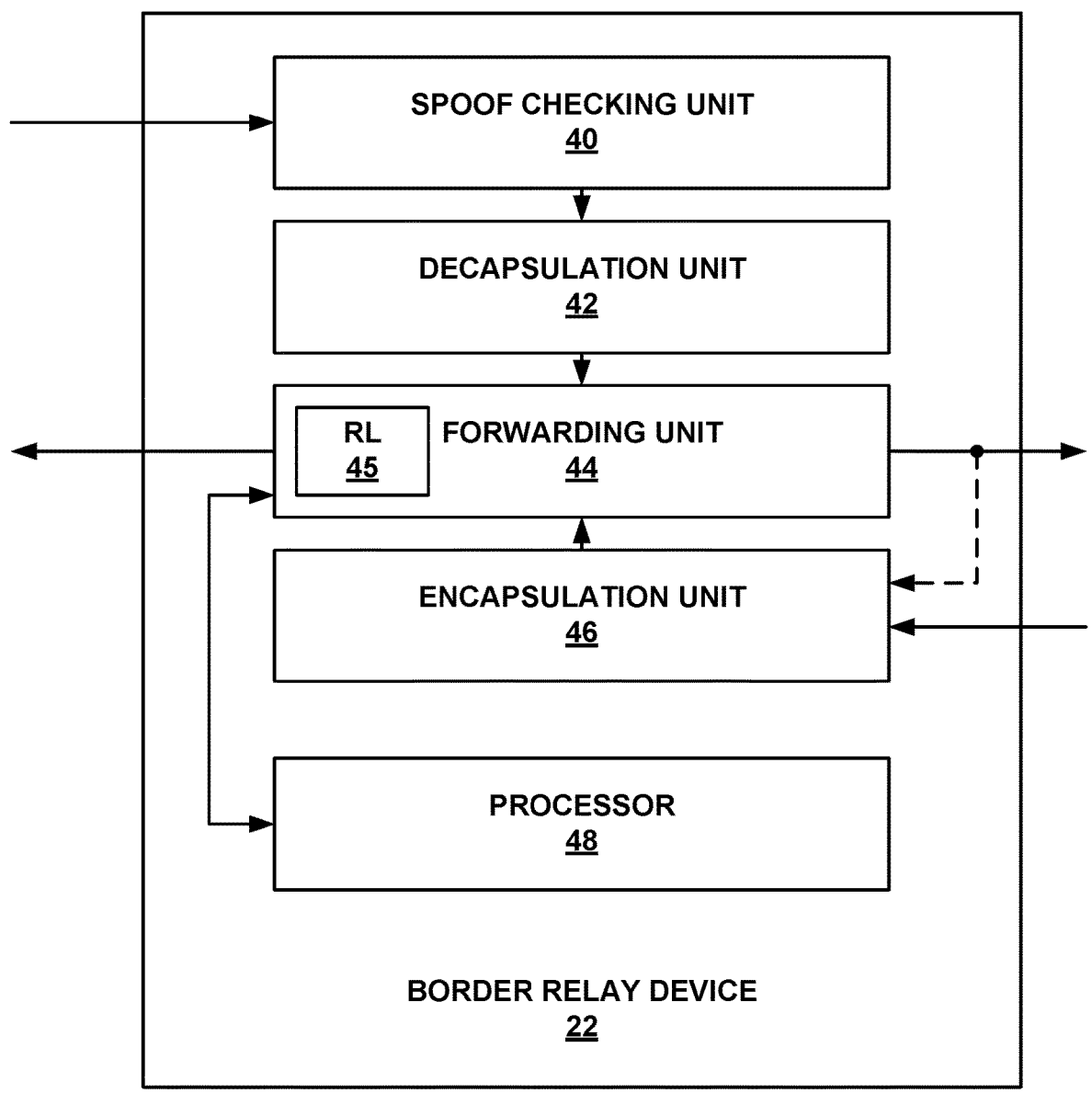
FIG. 3 is a block diagram illustrating an example border relay device that implements the techniques of this disclosure.

FIG. 3 is a block diagram illustrating an example border relay device that implements the techniques of this disclosure. As illustrated, border relay device 22 includes spoof checking unit 40, decapsulation unit 42, forwarding unit 44, encapsulation unit 46, and processor 48. Examples of processor 48 include a general purpose processor, a DSP, an ASIC, a FPGA, or other equivalent integrated or discrete logic circuitry. Processor 48 may include analog circuits, and/or programmable cores, formed from programmable circuits. In examples where the operations are performed using software executed by the programmable circuits, a computer-readable storage device may store the object code of the software that processor 48 receives and executes.

Spoof checking unit 40, decapsulation unit 42, forwarding unit 44, and encapsulation unit 46 may be formed in processing circuitry separate from processor 48; although it is possible for processor 48, spoof checking unit 40, decapsulation unit 42, forwarding unit 44, and encapsulation unit 46 to be formed in the same circuitry. As one example, spoof checking unit 40, decapsulation unit 42, forwarding unit 44, and encapsulation unit 46 may be formed in one or more ASICs or FPGAs. In some examples, spoof checking unit 40, decapsulation unit 42, forwarding unit 44, and encapsulation unit 46 are dedicated hardware circuit blocks that are configured to perform forwarding operations of forwarding packets from source to destination.

Processor 48 forms a so-called control path and decapsulation unit 42, forwarding unit 44, and encapsulation unit 46 form a forwarding path of HD 16. Processor 48 determines the information that forwarding unit 44 uses to forward packets. For example, processor 48 may be configured to perform operations such as allocate resources, determining routing state, address resolution protocol (ARP) handling, security functions, establishing and maintaining management sessions, and the like. The forwarding path that includes decapsulation unit 42, forwarding unit 44, and encapsulation unit 46 is a fast path because packets are continuously being received or transmitted by border relay device 22 and therefore the decapsulation, forwarding, and encapsulation operations need to occur relatively fast. In this way, the operations of processor 48 and decapsulation unit 42, forwarding unit 44, and encapsulation unit 46 may be separated out from one another.

In one or more examples, for upstream communication, spoof checking unit 40 receives an IPv6 packet from provider network 12 and determines whether the packet is properly formed. Spoof checking unit 40 is not necessary in all examples. If the IPv6 packet is not properly formed (e.g., addressing is incorrect), spoof checking unit 40 drops the packet from further processing. If the IPv6 packet is properly formed, spoof checking unit 40 transmits the packet to decapsulation unit 42 for decapsulation.

Decapsulation unit 42 extracts the IPv4 packet that is encapsulated in the IPv6 packet. Decapsulation unit 42 transmits the IPv4 packet to forwarding unit 44 for forwarding. For example, if the IPv4 destination address is the IPv4 destination address of server 20, forwarding unit 44 forwards the IPv4 packet to server 20 via public network 14.

For downstream communication, encapsulation unit 46 receives an IPv4 packet and encapsulates the IPv4 packet into an IPv6 packet. Forwarding unit 44 receives the IPv6 packet and forwards the IPv6 packet. For example, forwarding unit 44 determines the IPv6 destination address and transmits the IPv6 packet to the destination address. As one example, for packets destined for HD 16, the IPv6 destination address is that of HD 16.

In one or more examples, decapsulation unit 42 decapsulates an IPv6 packet to extract the IPv4 packet. If the IPv4 destination address of the IPv4 packet is HD 16 (e.g., the IPv4 packet is a loop-back packet), forwarding unit 44 send the IPv4 packet directly to encapsulation unit 46 (e.g., as shown with dashed line in FIG. 3). Encapsulation unit 46 encapsulates the IPv4 packet into an IPv6 packet and forwarding unit 44 transmits the IPv6 packet back to HD 16. In this way, the loop-back packet travels through the forwarding path of border relay device 22 and does not need to enter through the control path (e.g., processor 48 may not need to perform any processing on the loop-back packet).

In some examples, forwarding unit 44 includes rate limiter (RL) 45. RL 45 is optional and is used to rate limit the loop-back packets to avoid misuse of BR operation application 26. As one example, it may be possible that there are multiple instances of BR operation application 26 executing on different examples of HD 16. In one or more examples, to misuse BR operation application 26 in an effort to attack border relay device 22, it may be possible to cause each instance of BR operation application 26 to repeatedly transmit loop-back packets. In this case, even though the loop-back packets travel through the forwarding path of border relay device 22, the volume of loop-back packets may negatively impact the operation of border relay device 22 such as by delaying or dropping of actual payload in packets. To mitigate against such attacks, RL 45 may be configured to determine a number of loop-back packets (e.g., by evaluating the source and destination addresses in the IPv4 packets) that forwarding unit 44 is transmitting within a given amount of time. If the rate at which forwarding unit 44 is transmitting loop-back packets is greater than a threshold, RL 45 may limit the transmission rate of the loop-back packets to minimize the impact on border relay device 22.

Figure 4:
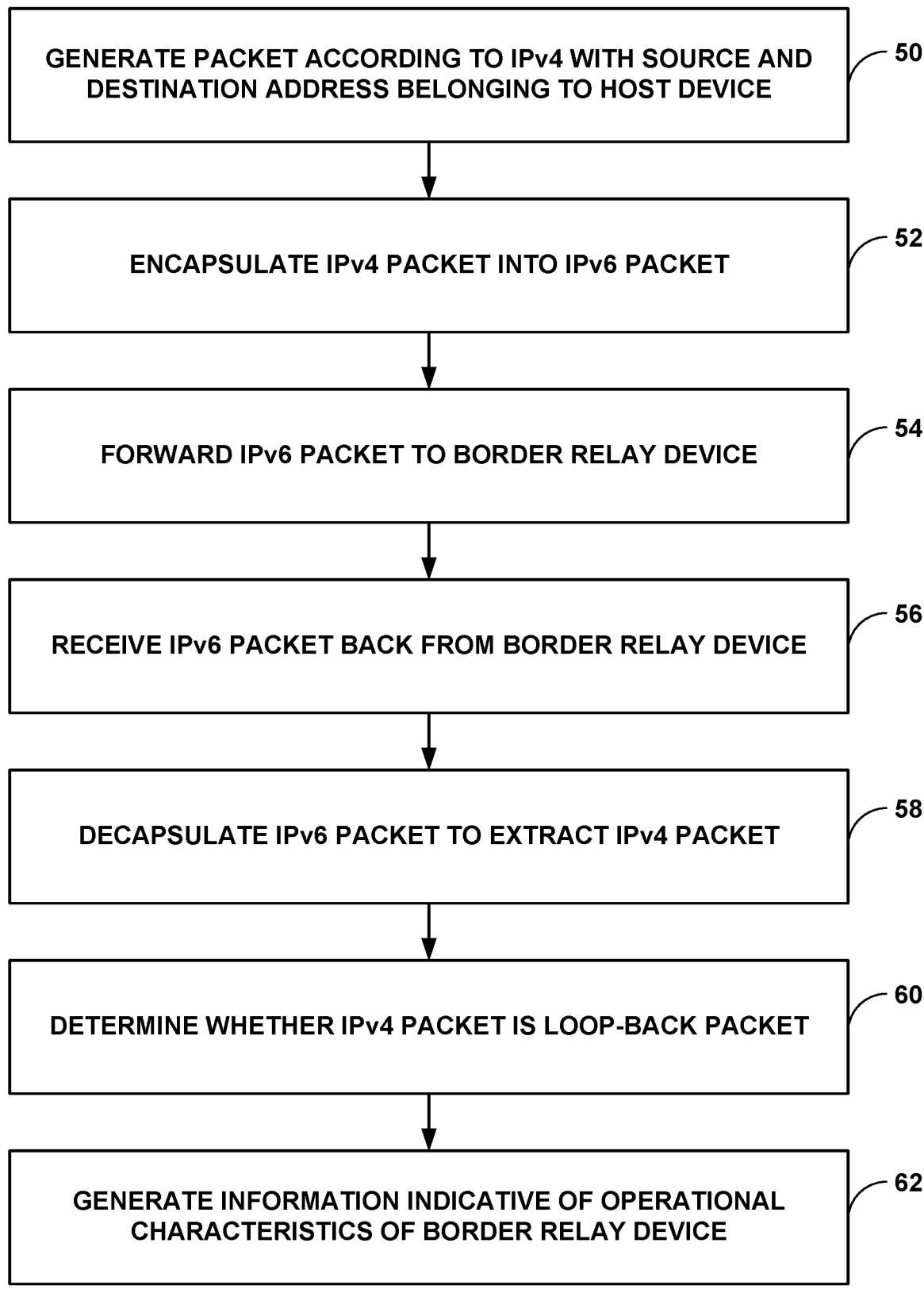
FIG. 4 is a flowchart illustrating an example method of operation in accordance with techniques of this disclosure.

FIG. 4 is a flowchart illustrating an example method of operation in accordance with techniques of this disclosure. FIG. 4 is described with an example of the way in which a loop-back packet originates from HD 16 and returns back to HD 16. Processor 24 of HD 16 (e.g., via execution of BR operation application 26) causes packet generator 28 to generate an IPv4 packet with a source address, source port, destination address, and destination port from source addresses, source ports, destination addresses, and destination ports belonging to HD 16 (50). As one example, packet generator 28 generates an IPv4 packet with IPv4 source address of 192.0.2.100, IPv4 destination address of 192.0.2.100, IPv4 source port of 4928, and IPv4 destination port of 4928. In this example, because the source and destination addresses, and the source and destination ports all belong to HD 16, the IPv4 packet is a loop-back packet. Also, although the source and destination addresses are the same, and the source and destination ports are the same, the techniques are not so limited. The source and destination addresses may be different but belong to HD 16, and the source and destination ports may be different but belong to HD 16.

Encapsulation unit 34 encapsulates the IPv4 packet to IPv6 packet and includes IPv6 address information based on the IPv4 address information (52). For example, the IPv6 source address for HD 16 may be preassigned as 2001:db8:6434:0000:0000:c000:0264:0034. Assume that the IPv6 destination address for border relay device 22 is 2001:db8:ffff:1. In this case, encapsulation unit 34 assigns the destination address for the IPv6 packet as 2001:db8:ffff:1. Forwarding unit 32 then outputs the IPv6 packet to border relay device 22 through provider network 12 (54).

Spoof checking unit 40 of border relay device 22 receives the IPv6 packet and confirms that the IPv6 packet is properly formed. Decapsulation unit 42 receives the IPv6 packet from spoof checking unit 40 and decapsulates the IPv6 packet to extract the IPv4 packet. For example, decapsulation unit 42 extracts the IPv4 packet having the IPv4 source and destination addresses as 192.0.2.100 and the source and destination port as 4928.

Forwarding unit 44 receives the IPv4 packet and based on the IPv4 destination address determines that the IPv4 packet is to be transmitted to HD 16. Accordingly, forwarding unit 44 transmits the IPv4 packet to encapsulation unit 46. Encapsulation unit 46 encapsulates the IPv4 packet into an IPv6 packet. For example, encapsulation unit 46 assigns the IPv6 source address of the IPv6 packet as 2001:db8:ffff::1 (e.g., the IPv6 address of border relay device 22) and assigns the IPv6 destination address of 2001:db8:6434:0000:0000:c000:0264:0034 (e.g., the IPv6 address of HD 16).

Forwarding unit 44 receives the IPv6 packet from encapsulation unit 46 and based on the IPv6 destination address, determines that the IPv6 packet is to be transmitted to HD 16. Forwarding unit 44 then transmits the IPv6 packet through provider network 12 to HD 16. Decapsulation unit 30 of HD 16 receives the IPv6 packet from border relay device 22 (56) and decapsulates the IPv6 packet to extract the IPv4 packet (58). For example, decapsulation unit 30 of HD 16 may receive, from border relay device 22 through provider network 12 configured to carry packets according to a first protocol (e.g., IPv6), a first packet generated according to the first protocol (e.g., an IPv6 packet). The first packet (e.g., IPv6 packet) encapsulates a second packet (e.g., IPv4 packet) generated according to a second protocol (e.g., IPv4). Decapsulation unit 30 may decapsulate the first packet to extract the second packet.

Forwarding unit 44 may have previously outputted the first packet (e.g., IPv6 packet) according to the first protocol to border relay device 22. For example, the first packet that forwarding unit 44 outputs is the first packet that decapsulation unit 30 receives and the second packet encapsulated into the first packet by encapsulation unit 34 is the second packet that processor 24 determines as previously transmitted to border relay device 22.

Processor 24 may determine that the IPv4 packet is a loop-back packet because the IPv4 source and destination addresses belong to HD 16 and transmits the IPv4 packet to processor 24 (60). In some examples, processor 24 may confirm that the IPv4 truly is a loop-back packet such as by determining at least one of whether the source address, the source port, the destination address, and the destination port of the second packet belong to HD 16 or whether the second packet includes data indicative of the second packet being the loop-back packet (e.g., a unique signature in the second packet that processor 24 uses to ensure that packet is identified as a loop-back packet).

Processor 24 (e.g., via BR operation application 26) then generates information indicative of operational capabilities of border relay device 22 based on whether the second packet is a loop-back packet (62). Examples of information indicative of operational capabilities include information indicative of border relay device 22 being reachable based on the second packet being the loop-back packet or information indicative of decapsulation and encapsulation operation at the border relay device being performed correctly based on the second packet being the loop-back packet. As some additional examples, processor 24 may generate information indicative of whether the border relay device is logically one hop from the host device based on a time-to-live (TTL) value in the second packet.

In some examples, processor 24 may cause HD 16 to transmit successive loop-back packets having different packet sizes. Processor 24 may determine for which loop-back packet of the successive loop-back packets border relay device 22 did not transmit back the loop-back packet of the successive loop-back packets or border relay device 22 fragmented the loop-back packet of the successive loop-back packets and generate information indicative of at least one of a maximum transmission unit (MTU), fragmentation capabilities, and/or reassembly capabilities of border relay device 22 based on the determination of the loop-back packet of the successive loop-back packets that border relay device 22 did not transmit back or that border relay device 22 fragmented.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The invention claimed is:

1. A host device comprising:
   a decapsulation unit configured to:
      receive, from a border relay device through a provider network configured to carry packets according to a first protocol, a first packet generated according to the first protocol, wherein the first packet encapsulates a second packet generated according to a second protocol; and
      decapsulate the first packet to extract the second packet; and
   a processor configured to:
      determine whether the second packet is a loop-back packet that the host device had previously transmitted to the border relay device, wherein the second packet is the loop-back packet when a source address, a source port, a destination address, and a destination port of the second packet belong to the host device; and
      based on whether the second packet is the loop-back packet, generate information indicative of operational characteristics of the border relay device.

2. The host device of claim 1, further comprising:
   a packet generator configured to generate the second packet according to the second protocol and assign the source address, the source port, the destination address, and the destination port from source addresses, source ports, destination addresses, and destination ports belonging to the host device;
   an encapsulation unit configured to encapsulate the second packet into the first packet according to the first protocol; and
   a forwarding unit configured to output the first packet according to the first protocol to the border relay device, wherein the first packet that the forwarding unit outputted is the first packet that the decapsulation unit receives and the second packet encapsulated into the first packet by the encapsulation unit is the second packet that the processor determines as being previously transmitted to the border relay device.

3. The host device of claim 1, wherein the first protocol is Internet Protocol version 6 (IPv6) and the second protocol is Internet Protocol version 4 (IPv4).

4. The host device of claim 1, wherein to determine whether the second packet is a loop-back packet that the host device had previously transmitted to the border relay device, the processor is configured to determine at least one of whether the source address, the source port, the destination address, and the destination port of the second packet belong to the host device or whether the second packet include data indicative of the second packet being the loop-back packet.

5. The host device of claim 1, wherein the processor is configured to generate information indicative of the border relay device being reachable based on the second packet being the loop-back packet.

6. The host device of claim 1, wherein the processor is configured to generate information indicative of decapsulation and encapsulation operation at the border relay device being performed correctly based on the second packet being the loop-back packet.

7. The host device of claim 1, wherein the processor is configured to generate information indicative of whether the border relay device is logically one hop from the host device based on a time-to-live (TTL) value in the second packet.

8. The host device of claim 1, wherein the processor is configured to:
determine a time at which the second packet is received and a time at which the host device had previously transmitted the second packet to the border relay device; and
generate information indicative of a latency through the provider network based on the time at which the second packet is received and the time at which the host device had previously transmitted the second packet to the border relay device.

9. The host device of claim 1, wherein the processor is configured to:
cause the host device to transmit successive loop-back packets having different packet sizes;
determine for which loop-back packet of the successive loop-back packets the border relay device did not transmit back the loop-back packet of the successive loop-back packets or the border relay device fragmented the loop-back packet of the successive loop-back packets; and
generate information indicative of at least one of a maximum transmission unit (MTU), fragmentation capabilities, or reassembly capabilities of the border relay device based on the determination of the loop-back packet of the successive loop-back packets that the border relay device did not transmit back or that the border relay device fragmented.

10. A method comprising:
receiving, with a host device and from a border relay device through a provider network configured to carry packets according to a first protocol, a first packet generated according to the first protocol, wherein the first packet encapsulates a second packet generated according to a second protocol;
decapsulating the first packet to extract the second packet;
determining whether the second packet is a loop-back packet that the host device had previously transmitted to the border relay device, wherein the second packet is the loop-back packet when a source address, a source port, a destination address, and a destination port of the second packet belong to the host device; and
based on whether the second packet is the loop-back packet, generating information indicative of operational characteristics of the border relay device.

11. The method of claim 10, further comprising:
prior to receiving the first packet:
generating the second packet according to the second protocol and assigning the source address, the source port, the destination address, and the destination port from source addresses, source ports, destination addresses, and destination ports belonging to the host device;
encapsulating the second packet into the first packet according to the first protocol; and
outputting the first packet according to the first protocol to the border relay device.

12. The method of claim 10, wherein the first protocol is an Internet Protocol version 6 (IPv6) and the second protocol is an Internet Protocol version 4 (IPv4).

13. The method of claim 10, wherein determining whether the second packet is a loop-back packet that the host device had previously transmitted to the border relay device comprises determining at least one of whether the source address, the source port, the destination address, and the destination port of the second packet belong to the host device or whether the second packet include data indicative of the second packet being the loop-back packet.

14. The method of claim 10, wherein generating information comprises generating information indicative of the border relay device being reachable based on the second packet being the loop-back packet.

15. The method of claim 10, wherein generating information comprises generating information indicative of decapsulation and encapsulation operation at the border relay device being performed correctly based on the second packet being the loop-back packet.

16. The method of claim 10, wherein generating information comprises generating information indicative of whether the border relay device is logically one hop from the host device based on a time-to-live (TTL) value in the second packet.

17. The method of claim 10, further comprising:
determining a time at which the second packet is received and a time at which the host device had previously transmitted the second packet to the border relay device; and
generating information indicative of a latency through the provider network based on the time at which the second packet is received and the time at which the host device had previously transmitted the second packet to the border relay device.

18. The method of claim 10, further comprising:
causing the host device to transmit successive loop-back packets having different packet sizes;
determining for which loop-back packet of the successive loop-back packets the border relay device did not transmit back the loop-back packet of the successive loop-back packets or the border relay device fragmented the loop-back packet of the successive loop-back packets; and
generating information indicative of at least one of a maximum transmission unit (MTU), fragmentation capabilities, or reassembly capabilities of the border relay device based on the determination of the loop-back packet of the successive loop-back packets that the border relay device did not transmit back or that the border relay device fragmented.

19. A system comprising:
a host device configured to transmit a first IPv6 packet that encapsulates a first IPv4 packet, wherein an IPv4 source address, an IPv4 source port, an IPv4 destination address, and an IPv4 destination port of the first IPv4 packet belong to the host device; and
a border relay device configured to:
receive the first IPv6 packet and decapsulate the first IPv6 packet to extract the first IPv4 packet;
based on the destination address of the first IPv4 packet, encapsulate the first IPv4 packet to generate a second IPv6 packet having an IPv6 destination address of the host device; and forward the second IPv6 packet to the host device, wherein the host device is configured to:

decapsulate the second IPv6 packet to extract the first IPv4 packet;

determine that the first IPv4 packet is a loop-back packet that the host device had previously transmitted to the border relay device; and based on the determination that the first IPv4 packet is the loop-back packet, generate information indicative of operational characteristics of the border relay device.

20. The system of claim 19, wherein the information indicative of the operational characteristics includes one or more of information indicative of reachability of the border relay device or information indicative of decapsulation and encapsulation operation at the border relay device being performed correctly.

* * * * *